(No Model.)
W. ZANDER.
SNAP HOOK.
No. 598,300. Patented Feb. 1, 1898.
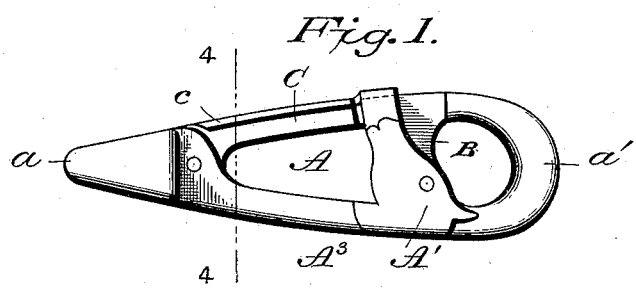
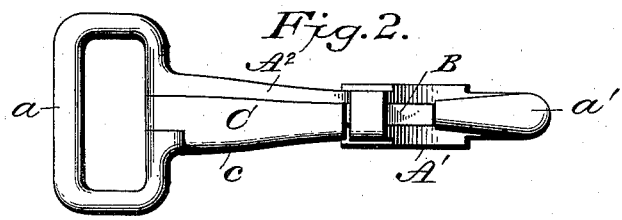
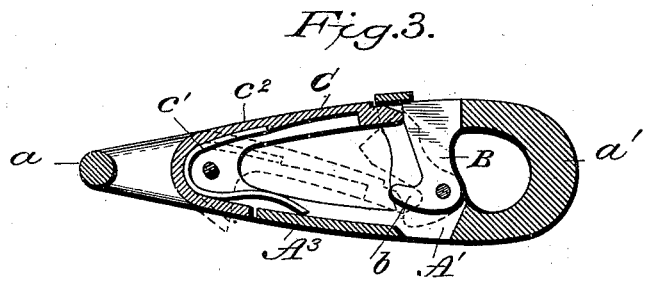
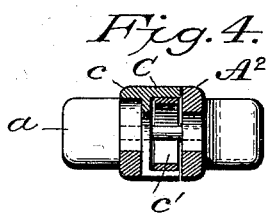
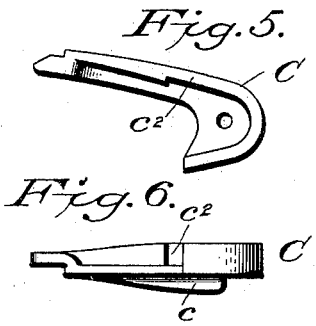
WITNESSES:
G. S. Elliott.
D. L. Rice.
INVENTOR:
William Zander
by Eugene W. Johnson
his attorney.
THE NORRIS PETERS CO., PHOTO-LITHO., WASHINGTON, D. C.

UNITED STATES PATENT OFFICE.

WILLIAM ZANDER, OF STANTON COUNTY, NEBRASKA.

SNAP-HOOK.

SPECIFICATION forming part of Letters Patent No. 598,300, dated February 1, 1898.

Application filed June 9, 1897. Serial No. 639,990. (No model.)

*To all whom it may concern:*

Be it known that I, WILLIAM ZANDER, a citizen of the United States of America, residing in the county of Stanton and State of Nebraska, have invented certain new and useful Improvements in Snap-Hooks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain new and useful improvements in snap-hooks, the object being to provide a snap-hook of improved construction in which the point of the hook will be guarded and the opening to the eye of the hook closed by a dog which is held in a locked position by a thumb-piece, said dog being movable upon a pivot and actuated by a thumb-piece which is moved in one direction by a spring attached thereto, said spring engaging with the frame.

The invention consists in the construction of the frame and in the combination therewith of a pivoted dog and thumb-piece, both of which play between side pieces or a loop forming part of the frame, as will be hereinafter set forth.

In the accompanying drawings, which illustrate my invention, Figure 1 is a side elevation of a snap-hook constructed in accordance with my improvement. Fig. 2 is a top view; Fig. 3, a longitudinal sectional view; Fig. 4, a vertical sectional view taken through the line 4 4 of Fig. 1. Figs. 5 and 6 are detached views of the thumb-piece.

A refers to the frame of the hook, which is provided with a loop $a$, and opposite thereto the hook $a'$. At a suitable point beyond the end of the hook the frame is provided with a portion A', having side and top walls, between which is pivoted a dog B, the pivotal point of said dog being slightly above the member of the hook which extends therefrom. One side of this looped portion of the frame is connected to the rear or part carrying the loop $a$ by a connecting-bar $A^2$. The part $A^3$ of the frame is recessed and has an opening located to one side of the dog and is open adjacent to the loop $a$ to permit the pivotal movement of the thumb-piece.

The thumb-piece C is pivoted to the frame adjacent to the loop $a$, and this thumb-piece carries a spring $c'$, which is adapted to bear upon the frame and hold the end of the thumb-piece nearest the hook raised and in engagement with the cross-bar of the loop, and when in engagement therewith it will also engage with one side of the dog and hold the same locked and in contact with the end of the hook. When the thumb-piece is depressed against the action of the spring, the free end of the same will engage with the tongue $b$ on the portion of the dog adjacent to its pivot, so as to move the dog within the looped frame, so as to leave a passage-way between said looped frame and the end of the hook. The looped frame between which the dog plays will prevent lateral movement of said dog, and the end of the thumb-piece also plays between the side pieces of the frame and is held against lateral movement thereby while its upward movement is limited by the cross-bar. The thumb-piece when its end is in engagement with the cross-bar of the looped frame lies flush with the member or part $A^3$ of the frame A, and in order to provide a bearing-surface in operating the thumb-piece it is constructed with a side flange $c$. The spring $C'$ is made up of a single piece of flat metal, one end of which is rigidly attached to the thumb-piece, while the other end bears upon the frame, said spring being located to one side of the center of the frame, so that it will extend from the flange $c^2$ to the flange on the frame opposite thereto.

A snap-hook constructed as hereinbefore described does not present any projecting portions which are liable to catch in harness when the same is in use and the point of the hook is thoroughly guarded, and when the thumb-piece is in its normal position the opening is closed by the dog, said dog being locked.

I am aware that prior to my invention it has been proposed to provide snap-hooks with pivoted portions or members for closing the opening to the hook, said member being pivoted and operated by a lever or thumb-piece which is spring-actuated in one direction, and I therefore do not claim such invention broadly; but

What I claim as new, and desire to secure by Letters Patent, is—

1. In combination with the frame of a snap-hook having a looped portion, of a dog pivoted within looped portion, a thumb-piece pivoted to the hook, the free end of said thumb-piece playing within the looped frame and adapted when depressed to retract the dog, said thumb-piece also engaging with the cross-bar of the looped frame and when in such engagement locking the dog, substantially as shown.

2. In combination with the frame of a snap-hook having adjacent to the hook thereof projecting side members connected by a cross-bar at a point adjacent to the end of the hook, of a dog pivoted within said looped frame, said dog having a tongue $b$, a thumb-piece spring-actuated in one direction pivoted to the frame and held normally in engagement with the cross-bar of the looped frame by a spring, said thumb-piece serving as a lock for the dog and means for retracting the same within the looped frame, substantially as shown.

3. The combination in a snap-hook of a frame having a looped portion $A'$ the side pieces of which are connected by a cross-bar and with the main frame by a connecting-bar $A^2$, the parts being integral with the main frame, a dog pivoted between the side bars of the looped frame, a thumb-piece pivoted to the portion of the frame opposite the hook or adjacent to the loop said thumb-piece having a lifting-spring and a reduced end opposite its pivot which plays between the pieces of the looped frame for engagement with the cross-bar thereof and with the dog said thumb-piece holding the dog locked and in a raised position and retracted when depressed, substantially as shown and for the purpose set forth.

In testimony whereof I affix my signature in presence of two witnesses.

WILLIAM ZANDER.

Witnesses:
I. N. VINING,
A. A. KEARNEY.